US012120631B2

(12) United States Patent
Lai et al.

(10) Patent No.: US 12,120,631 B2
(45) Date of Patent: Oct. 15, 2024

(54) UNMANNED VEHICLE-ASSISTED TESTING

(71) Applicant: Telefonaktiebolaget LM Ericsson (publ), Stockholm (SE)

(72) Inventors: Xiaoming Lai, Ottawa (CA); Weigang Li, Ottawa (CA); Xixian Chen, Ottawa (CA); Dongsheng Yu, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 362 days.

(21) Appl. No.: 17/613,206

(22) PCT Filed: Jun. 21, 2019

(86) PCT No.: PCT/IB2019/055267
§ 371 (c)(1),
(2) Date: Nov. 22, 2021

(87) PCT Pub. No.: WO2020/254866
PCT Pub. Date: Dec. 24, 2020

(65) Prior Publication Data
US 2022/0225269 A1    Jul. 14, 2022

(51) Int. Cl.
*H04W 64/00* (2009.01)
*G05D 1/00* (2006.01)
(Continued)

(52) U.S. Cl.
CPC .......... *H04W 64/006* (2013.01); *G05D 1/101* (2013.01); *H04B 7/0452* (2013.01); *H04W 24/06* (2013.01)

(58) Field of Classification Search
CPC ... H04W 64/00; H04W 64/006; H04W 24/00; H04W 24/02; H04W 24/04; H04W 24/06; H04W 24/08; G05D 1/101; H04B 7/0452
See application file for complete search history.

(56) References Cited

U.S. PATENT DOCUMENTS

2015/0312774 A1   10/2015  Lau
2018/0352452 A1*  12/2018  Parthasarathy ...... G08G 5/0069
(Continued)

FOREIGN PATENT DOCUMENTS

WO    2017/011412 A1    1/2017
WO    2019/092476 A1    5/2019

OTHER PUBLICATIONS

International Search Report and Written Opinion dated Mar. 3, 2020 issued in PCT Application No. PCT/IB2019/055267, consisting of 14 pages.

Primary Examiner — Siu M Lee
(74) Attorney, Agent, or Firm — Sage Patent Group

(57) ABSTRACT

Methods and apparatuses are provided for network testing. In one embodiment, a method in an unmanned vehicle includes controlling a movement of the unmanned vehicle carrying the UE according to a testing location algorithm, the testing location algorithm comprising moving the unmanned vehicle carrying the UE to at least one candidate testing location, determining at least one measurement value at the at least one candidate testing location and determining a reference location based at least in part on the determined at least one measurement value. In another embodiment, a method in a network node initiating a launch of at least one unmanned vehicle of a plurality the unmanned vehicle carrying the UE to at least one candidate testing of unmanned vehicles, each of the at least one unmanned vehicle moving one of the plurality of UEs to a reference location, each reference location corresponding to a testing location.

30 Claims, 7 Drawing Sheets

(51) Int. Cl.
  *H04B 7/0452* (2017.01)
  *H04W 24/06* (2009.01)

(56) References Cited

U.S. PATENT DOCUMENTS

2020/0202730 A1\* 6/2020 Nayak .................... G08G 5/045
2020/0275291 A1\* 8/2020 Moisio .................... G01S 19/46

\* cited by examiner

UNMANNED VEHICLE-ASSISTED TESTING

CROSS-REFERENCE TO RELATED APPLICATIONS

This application is a Submission Under 35 U.S.C. § 371 for U.S. National Stage Patent Application of International Application Number: PCT/IB2019/055267, filed Jun. 21, 2019 entitled "UNMANNED VEHICLE-ASSISTED TESTING," the entirety of which is incorporated herein by reference.

TECHNICAL FIELD

The present disclosure relates to wireless network testing and, in particular, to unmanned vehicle-assisted testing.

BACKGROUND

Multi-user multiple-input multiple-output (MIMO), as enhanced largely by Massive MIMO beamforming, are widely supported in $4^{th}$ Generation (4G) and 5th Generation (5G) (also referred to as New Radio or NR) mobile networks to increase cell throughput and capacity, thereby improving overall network performance and spectrum efficiency. FIG. 1 is an illustration of a network node (e.g., base station) and the network node's coverage areas through multiple beams. The cone shape depicted in FIG. 1 is a representation of a radio wave signal coverage area from this network node. All the user equipments (UEs) within the coverage area are able to receive the radio signal from the network node and are able to receive service from that network node. The circle cross-section, shown in the lower part of FIG. 1, is a section plane of the cone in FIG. 1. Inside the circle cross-section, there is shown a number of small ovals which represent cross-sections of beams. Each small oval represents an individual beam of a network node in, for example, a 4G/5G system. If the UEs are located in different, separate small oval beams, such UEs are considered spatially separated and may therefore be scheduled to share the same time-frequency resource(s). These spatially separated UEs may receive their own data from the network node on the same shared time-frequency resource(s) simultaneously. This is also referred to as multi-user MIMO (MU-MIMO) pairing in 4G/5G.

MU-MIMO pairing provides an additional arrangement for increasing the spectrum efficiency of the network so that overall performance can be increased. The beams from the network node may also be referred to as layers. In the illustration depicted in FIG. 1, ovals of different shading are used to represent different beams. However, there is inter-beam interference at the edges of neighboring beams. When possible, the network node should schedule the UEs sharing the same physical resources when the UEs are not at the beam edge areas where there may be interference from neighboring beams.

Although MU-MIMO and pairing/scheduling algorithms have been discussed intensively in recently years, actual system deployment and testing is still quite a challenge due to the complexity of the radio wave propagation environment. For single-user MIMO (SU-MIMO), human manually controlled driving tests, as an example, may be used for measuring the link performance in a trial system or in the field of deployment. On the other hand, for MU-MIMO, paring of UEs (sometimes as many as 16 or more UEs) is almost impossible to be carried out manually in the whole coverage area to measure and verify the collective behavior of multiple UEs. Another challenge is that massive-MIMO Active Antenna System (AAS) is also targeting coverage in a vertical direction, in addition to coverage in the horizontal direction for the tradition cellular mobile system. Therefore, testing, such as MU-MIMO testing, can be particularly challenging.

SUMMARY

Some embodiments of the present disclosure advantageously provide methods, apparatuses and systems for unmanned vehicle-assisted testing.

According to a first aspect of the present disclosure, a method performed by an unmanned vehicle for wireless network testing is provided. The unmanned vehicle is configured to transport a user equipment, UE, the UE being configured to communicate over a wireless network. The method includes controlling a movement of the unmanned vehicle carrying the UE according to a testing location algorithm to identify a testing location for testing communication of the UE, the testing location algorithm comprising moving the unmanned vehicle carrying the UE to at least one candidate testing location, determining at least one measurement value at the at least one candidate testing location and determining a reference location based at least in part on the determined at least one measurement value.

In some embodiments of the first aspect, the method further includes, based on a predetermined condition, accepting the reference location as the testing location of the UE. In some embodiments of the first aspect, the controlling the movement of the unmanned vehicle according to the testing location algorithm further includes, iteratively:
  moving the unmanned vehicle carrying the UE from a first candidate testing location to a second candidate testing location and determining a measurement value when the UE is at the second candidate testing location;
  determining the reference location based at least in part on a comparison of at least a measurement value determined when the UE is at the first candidate testing location and the measurement value determined when the UE is at the second candidate testing location; and
  if a predetermined condition is met, accepting the reference location as the testing location of the UE.

In some embodiments of the first aspect, the method includes moving the unmanned vehicle carrying the UE to the reference location for testing the communication of the UE over the wireless network. In some embodiments of the first aspect, the determining the at least one measurement value at the at least one candidate testing location further includes determining a measurement value of a test parameter associated with the communication of the UE over the wireless network. In some embodiments of the first aspect, the determining the at least one measurement value at the at least one candidate testing location further includes determining a throughput value for test traffic sent to the UE. In some embodiments of the first aspect, the controlling the movement of the unmanned vehicle carrying the UE further comprises controlling a latitude, a longitude and an altitude of the unmanned vehicle according to the testing location algorithm. In some embodiments of the first aspect, the unmanned vehicle is an unmanned aerial vehicle, UAV.

In some embodiments of the first aspect, the identified testing location is for testing multi-user, MU, multiple-input multiple-output, MIMO, for a network node in communication with the UE and at least one other UE over the wireless network. In some embodiments of the first aspect, the determining the reference location based at least in part on the determined measurement value further includes comparing at least a first measurement value at a first candidate testing location to at least a second measurement value at a second candidate testing location; and updating the reference location to one of the first candidate testing location and the second candidate testing location based on the comparison. In some embodiments of the first aspect, the moving the unmanned vehicle carrying the UE to the at least one candidate testing location further includes, for each of a predetermined number of iterations, moving the unmanned vehicle carrying the UE a random distance away from a previous location.

According to a second aspect of the present disclosure, an unmanned vehicle for wireless network testing is provided. The unmanned vehicle is configured to transport a user equipment, UE, the UE being configured to communicate over a wireless network. The unmanned vehicle includes processing circuitry configured to cause the unmanned vehicle to control a movement of the unmanned vehicle, carrying a user equipment, UE, according to a testing location algorithm to identify a testing location for testing communication of the UE over a wireless network, the testing location algorithm comprising moving the unmanned vehicle carrying the UE to at least one candidate testing location, determining at least one measurement value at the at least one candidate testing location and determining a reference location based at least in part on the determined at least one measurement value.

In some embodiments of the second aspect, the processing circuitry is further configured to based on a predetermined condition, accept the reference location as the testing location of the UE. In some embodiments of the second aspect, the processing circuitry is further configured to control the movement of the unmanned vehicle according to the testing location algorithm by being further configured to, iteratively:

move the unmanned vehicle carrying the UE from a first candidate testing location to a second candidate testing location and determine a measurement value when the UE is at the second candidate testing location;
determine the reference location based at least in part on a comparison of at least a measurement value determined when the UE is at the first candidate testing location and the measurement value determined when the UE is at the second candidate testing location; and
if a predetermined condition is met, accept the reference location as the testing location of the UE.

In some embodiments of the second aspect, the processing circuitry is further configured to move the unmanned vehicle carrying the UE to the reference location for testing the communication of the UE over the wireless network. In some embodiments of the second aspect, the processing circuitry is further configured to determine the at least one measurement value at the at least one candidate testing location by being configured to determine a measurement value of a test parameter associated with the communication of the UE over the wireless network. In some embodiments of the second aspect, the processing circuitry is further configured to determine the at least one measurement value at the at least one candidate testing location by being configured to determine a throughput value for test traffic sent to the UE. In some embodiments of the second aspect, the processing circuitry is further configured to control the movement of the unmanned vehicle carrying the UE by being configured to control a latitude, a longitude and an altitude of the unmanned vehicle according to the testing location algorithm. In some embodiments of the second aspect, the unmanned vehicle is an unmanned aerial vehicle, UAV.

In some embodiments of the second aspect, the identified testing location is for testing multi-user, MU, multiple-input multiple-output, MIMO, for a network node in communication with the UE and at least one other UE over the wireless network. In some embodiments of the second aspect, the processing circuitry is further configured to determine the reference location based at least in part on the determined measurement value by being configured to compare at least a first measurement value at a first candidate testing location to at least a second measurement value at a second candidate testing location; and update the reference location to one of the first candidate testing location and the second candidate testing location based on the comparison. In some embodiments of the second aspect, the processing circuitry is further configured to move the unmanned vehicle carrying the UE to the at least one candidate testing location by being configured to for each of a predetermined number of iterations, move the unmanned vehicle carrying the UE a random distance away from a previous location.

According to a third aspect of the present disclosure, a method performed by a network node configured to test wireless communication with a plurality of user equipments, UEs, is provided. The method includes initiating a launch of at least one unmanned vehicle of a plurality of unmanned vehicles, each of the at least one unmanned vehicle moving one of the plurality of UEs to a reference location, each reference location corresponding to a testing location for testing wireless communication between the network node and the respective UE. The method includes as a result of determining that each of the plurality of UEs have been moved to each reference location by each of the plurality of unmanned vehicles, communicating test traffic to each of the plurality of UEs at the respective reference location. The method includes measuring at least one test parameter associated with the communication of the test traffic to each of the plurality of UEs.

In some embodiments of the third aspect, the measuring the at least one test parameter further includes at least one of:
measuring a throughput of the communication of the test traffic to each of the plurality of UEs;
calculating a total traffic from the plurality of UEs; and
calculating a total throughput from the plurality of UEs.

In some embodiments of the third aspect, the initiating the launch of the at least one unmanned vehicle further includes initiating the launch of each of the plurality of unmanned vehicles to move a corresponding one of the plurality of UEs to a center location of a beam, each one of the plurality of UEs being moved to the center location of a different beam in a multi-user multiple-input multiple-output environment. In some embodiments of the third aspect, the communicating the test traffic to each of the plurality of UEs at the respective reference location further includes transmitting, via a multiple-input multiple-output, MIMO, antenna system, the test traffic to each UE of the plurality of UEs in a spatially separate beam using a same time-frequency resource.

In some embodiments of the third aspect, the initiating the launch of the at least one unmanned vehicle further comprises initiating the launch of the at least one unmanned vehicle to move the respective UE according to a testing location algorithm to identify the testing location for testing communication of the respective UE, the testing location algorithm comprising moving the unmanned vehicle carrying the UE to at least one candidate testing location, determining at least one measurement value at the at least one candidate testing location and determining a reference location based at least in part on the determined at least one measurement value.

According to a fourth aspect of the present disclosure, a network node configured to test wireless communication with a plurality of user equipments, UEs, is provided. The network node includes processing circuitry configured to initiate a launch of at least one unmanned vehicle of a plurality of unmanned vehicles, each of the at least one unmanned vehicle moving one of the plurality of UEs to a reference location, each reference location corresponding to a testing location for testing wireless communication between the network node and the respective UE. The processing circuitry is configured to as a result of determining that each of the plurality of UEs have been moved to each reference location by each of the plurality of unmanned vehicles, communicate test traffic to each of the plurality of UEs at the respective reference location. The processing circuitry is configured to measure at least one test parameter associated with the communication of the test traffic to each of the plurality of UEs.

In some embodiments of the fourth aspect, the processing circuitry is further configured to measure the at least one test parameter by being configured to at least one of:
 measure a throughput of the communication of the test traffic to each of the plurality of UEs;
 calculate a total traffic from the plurality of UEs; and
 calculate a total throughput from the plurality of UEs.
In some embodiments of the fourth aspect, the processing circuitry is further configured to initiate the launch of the at least one unmanned vehicle by being configured to initiate the launch of each of the plurality of unmanned vehicles to move a corresponding one of the plurality of UEs to a center location of a beam, each one of the plurality of UEs being moved to the center location of a different beam in a multi-user multiple-input multiple-output environment. In some embodiments of the fourth aspect, the processing circuitry is further configured to communicate the test traffic to each of the plurality of UEs at the respective reference location by being configured to transmit, via a multiple-input multiple-output, MIMO, antenna system, the test traffic to each UE of the plurality of UEs in a spatially separate beam using a same time-frequency resource.

In some embodiments of the fourth aspect, the processing circuitry is further configured to initiate the launch of the at least one unmanned vehicle by being configured to initiate the launch of the at least one unmanned vehicle to move the respective UE according to a testing location algorithm to identify the testing location for testing communication of the respective UE, the testing location algorithm comprising moving the unmanned vehicle carrying the UE to at least one candidate testing location, determining at least one measurement value at the at least one candidate testing location and determining a reference location based at least in part on the determined at least one measurement value.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

In a lab environment, it is very hard to emulate the environment and field that the multi-user MIMO can be applied. A limited number of layers of MIMO can be tested in a lab environment using a very expensive channel emulator. In 5G, the number of antenna ports and supported layers have been increased greatly over legacy networks. Therefore, testing MU MIMO has become even harder to test. Field testing and measurement of MU-MIMO system becomes more necessary but is also challenging if limited to, for example, a human manually controlled driving test.

Thus, some embodiments of the present disclosure provide arrangements for a testing system using automated, or semi-automated, moving devices (e.g., unmanned vehicles carrying UEs). Some embodiments of the present disclosure provide an algorithm for the testing system to perform MU-MIMO testing and measurements.

The automated, or semi-automated, unmanned vehicles could be, for example, drones (programmed, or controlled using the techniques disclosed herein) carrying UEs, automated cars or other devices configured to communicate with a central test control station (e.g., network node). In addition, the devices may have 4G/5G communication capability.

Figure 1:
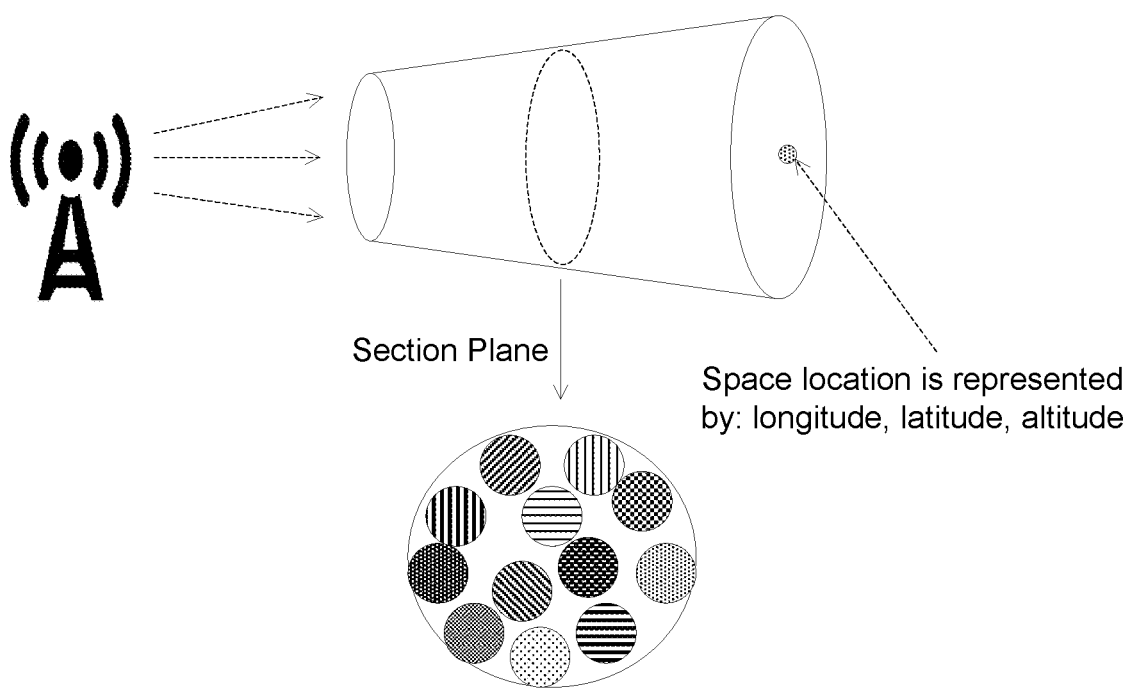
FIG. 1 illustrates an example network node coverage area including MIMO beams.

For example, if the UEs can be positioned in different beams (see e.g., beam cross-sections in FIG. 1), then MU-MIMO pairing can be tested for the positioned UEs. One challenging task is to find the appropriate locations for each of the UEs so that multiple UEs are able to take advantage of MU-MIMO and achieve the maximum throughput through UE paring.

In some embodiments, an unmanned vehicle is made to carry UE(s) for testing. Some embodiments of the present disclosure propose algorithms to control artificial intelligent (AI) capable unmanned vehicles (e.g., drones) to transport (e.g., fly) the UE(s) to the appropriate UE locations automatically for the MU-MIMO testing of a network node (e.g., eNB, gNB, etc.).

In some embodiments, the algorithms (e.g., testing location algorithm) described in this disclosure are described in terms of flying drones, but the principles disclosed can also be used by other types of unmanned vehicles or moving devices.

In some embodiments, the algorithms (e.g., testing location algorithm) described in this disclosure are described for MU-MIMO testing; however, the principles disclosed can be more widely used in all other types of wireless testing, such as, for example, channel estimation, beam forming algorithms, scheduling algorithms, etc.

Some embodiments of the present disclosure consider static beams and line of sight (LOS) for illustration purposes. However, beams of an AAS massive MIMO system can also dynamically adapt to environments or situations based on a change of the environment, a change in UE distribution, a change in UE load, etc. The general principles of the algorithms described in this disclosure can also be applied to these scenarios.

Advantageously, some embodiments of this disclosure make testing more convenient to implement, as compared to existing techniques. For example, in some embodiments, using the testing location algorithm may allow testers to easily position the UEs at locations where MU-MIMO can be tested (e.g., center of beams).

In addition, some embodiments of this disclosure are more cost efficient than existing testing arrangements. For example, some embodiments do not require use of expensive channel emulator equipment and/or do not require human being to manually hold UEs for testing.

In some embodiments, such as unmanned aerial vehicles (UAVs), testing can be extended to a vertical dimension, for which a traditional driving test is impossible. Some embodiments make testing more efficient over existing techniques.

Automated testing based on the disclosed testing location algorithm can cover the full coverage area more easily and, in less time, as compared to existing testing arrangements.

In some embodiments, the testing location algorithm may be used not only for MU-MIMO testing, but also for performance optimization of the network node (e.g., eNB, gNB). For example, the principles of the testing location algorithm can assist the network node to tune, for example, a scheduling algorithm. The testing location algorithm can also verify and improve, for example, a beam forming algorithm.

Before describing in detail exemplary embodiments, it is noted that the embodiments reside primarily in combinations of apparatus components and processing steps related to unmanned vehicle-assisted testing. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a user equipment (UE) such as a wireless device (WD) or a radio network node.

In some embodiments, the non-limiting terms wireless device (WD) or a user equipment (UE) are used interchangeably. The UE herein can be any type of wireless device capable of communicating with a network node or another UE over radio signals. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "unmanned vehicle" used herein can be any type of unmanned vehicle, such as an unmanned aerial system (UAS) and/or an unmanned aerial vehicle (UAV), such as, for example, a drone. The unmanned vehicle can be a ground vehicle, such as, for example, a motor vehicle, a smart car, etc. In some embodiments, the unmanned vehicle includes artificial intelligence (AI) configured to control the unmanned vehicle to perform the methods and techniques disclosed herein e.g., for testing a network, such as, MU MIMO testing.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB, relay node, access point, radio access point, Remote Radio Unit (RRU) Remote Radio Head (RRH).

As used herein, the term "carry" may be intended in a broad sense to indicate a UE being transported, delivered or otherwise physically moved from one location to one or more other locations, such as candidate testing locations, according to the techniques disclosed herein.

As used herein, the term "candidate testing location" may be used to indicate a location that a UE is transported to according to the techniques disclosed herein and which may be considered and/or evaluated as being a potential UE location for performing testing, such as, for example, a potential center of a beam for MU-MIMO testing.

As used herein, in some embodiments, the term "reference location" may be used to indicate a UE location (e.g., or a variable or object for storing the UE location) that has been evaluated and stored for later use based on the evaluation/measurement/condition. For example, in some embodiments, a candidate testing location may be evaluated based on a measured throughput and then stored as a reference location if the measured throughput value at the candidate testing location exceeds a previous throughput value measured at a previous candidate testing location. In some further embodiments, after a predetermined number of iterations (or other end condition), the resulting reference location is accepted as the testing location for the UE.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment, unmanned vehicle or a network node may be distributed over a plurality of user equipments, unmanned vehicles and/or network nodes. In other words, it is contemplated that the functions of the network node, unmanned vehicle and user equipment described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
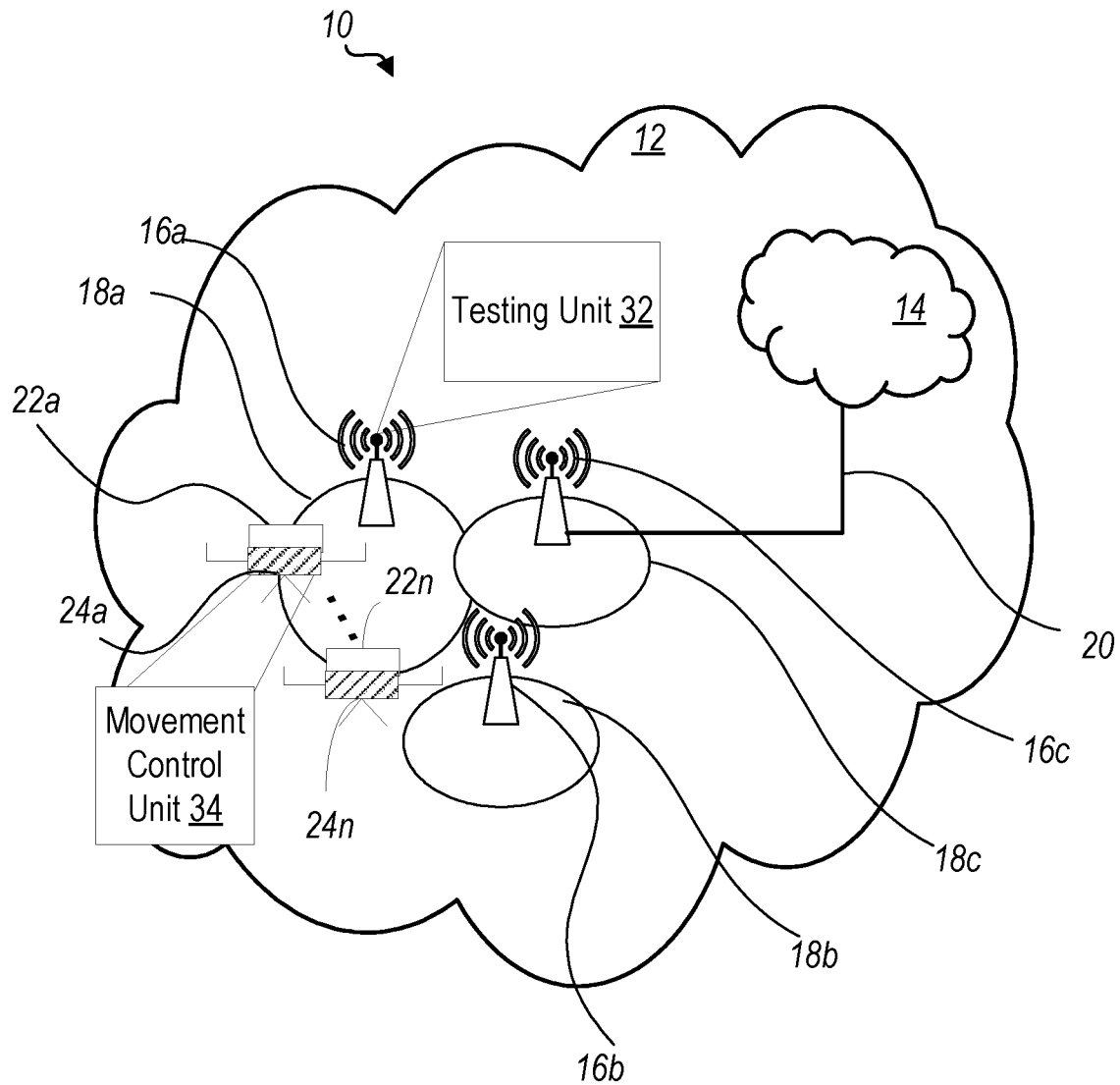
FIG. 2 is a schematic diagram of an exemplary network architecture illustrating a communication system including UEs, carried by unmanned vehicles and communicating with network node(s), according to one embodiment of the present disclosure.

Referring now to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired and/or wireless connection 20. A first user equipment (UE) 22a located in coverage area 18a is configured to wirelessly connect to, or be paged by, the corresponding network node 16a. In some embodiments, the UE 22a may be carried/transported by an unmanned vehicle 24a e.g., for testing purposes. A second UE 22n in coverage area 18a is wirelessly connectable to the corresponding network node 16a. The UE 22n may be carried/transported by an unmanned vehicle 24n, e.g., for testing purposes. There can be any number of UEs 22a-n and unmanned vehicles 24a-n in the communication system 10. While a plurality of UEs 22a, 22n (collectively referred to as user equipments 22) and a plurality of unmanned vehicles 24a, 24n are illustrated in this example, the disclosed embodiments are equally applicable to a situation where a sole UE 22 and/or a sole unmanned vehicle 24 is in the coverage area or where a sole UE 22 is connecting to the corresponding network node 16. Note that although only two UEs 22, two unmanned vehicles 24 and three network nodes 16 are shown for convenience, the communication system 10 may include many more UEs 22, unmanned vehicles 24 and network nodes 16.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN.

A network node 16 is configured to include a Testing unit 32 which is configured to initiate a launch of at least one unmanned vehicle of a plurality of unmanned vehicles, each of the at least one unmanned vehicle moving one of the plurality of UEs to a reference location, each reference location corresponding to a testing location for testing wireless communication between the network node and the respective UE; as a result of determining that each of the plurality of UEs have been moved to each reference location by each of the plurality of unmanned vehicles, communicate test traffic to each of the plurality of UEs at the respective reference location; and measure at least one test parameter associated with the communication of the test traffic to each of the plurality of UEs.

An unmanned vehicle 24 is configured to include a movement control unit 34 which is configured to control a movement of the unmanned vehicle, carrying a user equipment, UE, according to a testing location algorithm to identify a testing location for testing communication of the UE over a wireless network, the testing location algorithm comprising moving the unmanned vehicle carrying the UE to at least one candidate testing location, determining at least one measurement value at the at least one candidate testing location and determining a reference location based at least in part on the determined at least one measurement value.

Example implementations, in accordance with an embodiment, of the UE 22, network node 16 and unmanned vehicle 24 discussed in the preceding paragraphs will now be described with reference to FIG. 3. In a communication system 10, an unmanned vehicle 24 comprises hardware (HW) 38 including a communication interface 40 configured to set up and maintain a wired and/or wireless connection with an interface of a different communication device of the communication system 10. In some embodiments, communication interface 40 may be formed as or may include, for example, one or more RF transmitters, one or more RF receivers, and/or one or more RF transceivers. The unmanned vehicle 24 further comprises processing circuitry 42, which may have storage and/or processing capabilities.

The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by unmanned vehicle 24. Processor 44 corresponds to one or more processors 44 for performing unmanned vehicle 24 functions described herein. The unmanned vehicle 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to unmanned vehicle 24. The instructions may be software associated with controlling movement of the unmanned vehicle 24 according to the techniques described in the present disclosure.

The software 48 may be executable by the processing circuitry 42. The processing circuitry 42 of the unmanned vehicle 24 may include a movement control unit 34 configured to cause performance of the unmanned vehicle 24 functions and/or processes described herein (such as, for example, the process described with reference to the flowchart depicted in FIG. 4).

Figure 3:
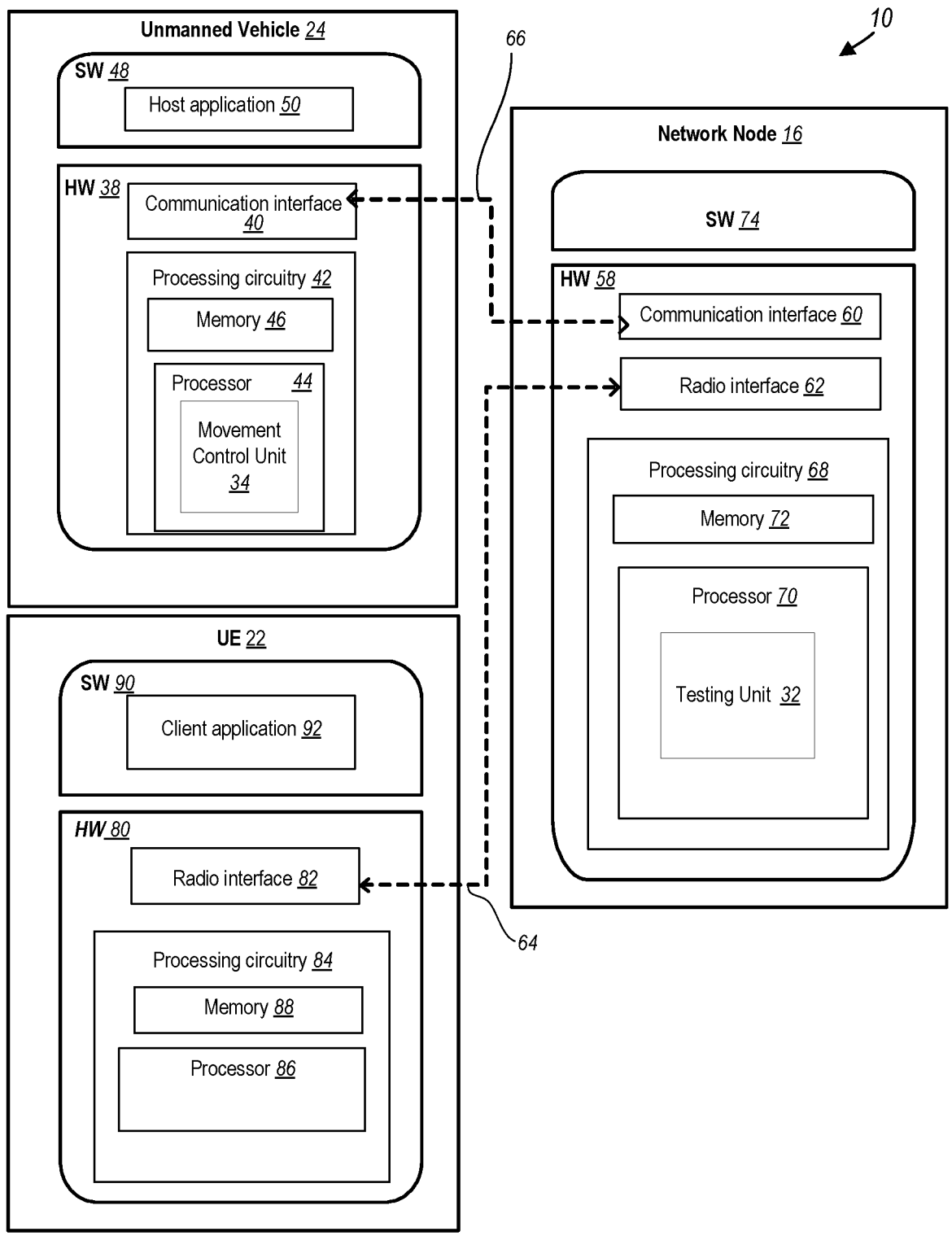
FIG. 3 is a block diagram of a network node in communication with a wireless device and an unmanned vehicle over an at least partially wireless connection according to some embodiments of the present disclosure.

The example unmanned vehicles 24 depicted in FIGS. 2 and 3 may be utilized by the methods and apparatuses described herein e.g., for testing MU MIMO. Although not illustrated in detail, the unmanned vehicle 24 may include various components for housing and transporting cargo, such as, for example, transporting a UE 22 to a testing location. For example, in one embodiment, the unmanned vehicle 24 is an unmanned aerial vehicle, such as, for example, a drone. In some embodiments, the drone may include a fuselage, rotors, and a payload compartment. The fuselage may be located at a central portion of the drone and may include (e.g., in an interior compartment) processing circuitry 42 (e.g., to control the flight of the drone, etc.), communication interface 40 (e.g., to send and/or receive information from network node 16), and a power supply (e.g., a battery). In some embodiments, the unmanned vehicle 24 includes four rotors (e.g., the drone is in a quad-copter configuration), which are, for example, connected to the fuselage and spaced in pairs on opposing sides of the fuselage in a substantially rectangular configuration.

Further, in some embodiments, each of the rotors may be configured to rotate or tilt about one or more axis to enhance the flight and/or flight control of the unmanned vehicle 24 to e.g., assist with controlling latitude, longitude and altitude of the unmanned vehicle 24 according to, for example, the testing location algorithm provided by the present disclosure.

The payload compartment (or payload mechanism) may be positioned below, and may be connected to, the fuselage. The payload compartment may be (or include) any container suitable for storing one or more items (e.g., UE 22) during the transportation process. Alternatively, the functionality provided by a payload compartment may be performed by a clamp or strap-like mechanism arranged to secure items (e.g., UE 22) for transport to e.g., a testing location.

Figure 6:
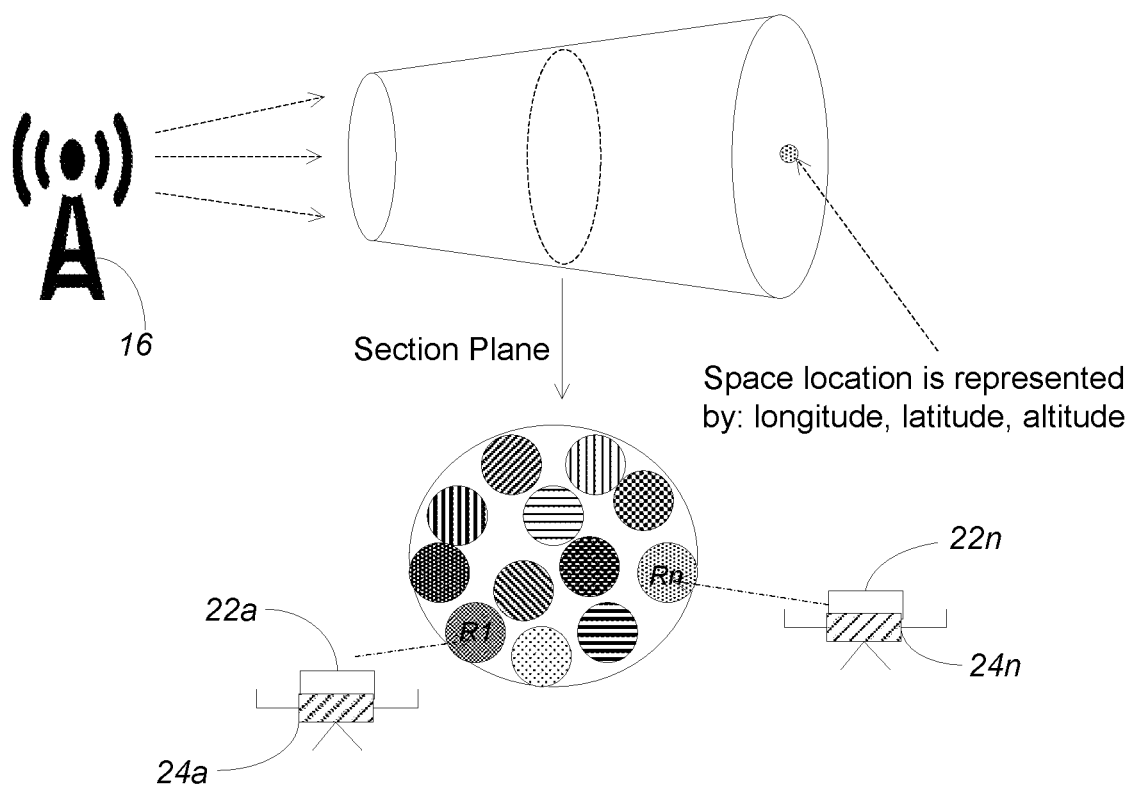
FIG. 6 is an example network node coverage area including MIMO beams and unmanned vehicles carrying UEs toward a center of each of the MIMO beams for testing MU-MIMO pairing.

It should be understood that the unmanned vehicle 24 shown in FIGS. 2, 3 and 6 are non-limiting examples. Other types and arrangements of unmanned vehicles 24 may be used to implement embodiments of the present disclosure.

The communication system 10 further includes a network node 16 provided in a communication system 10 and including hardware 58 enabling it to communicate with the UE 22 and/or unmanned vehicle 24. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66, such as a wireless connection, to the unmanned vehicle 24.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include Testing unit 32 configured to cause performance of the network node 16 functions and/or processes described herein (such as, for example, the process described with reference to the flowchart depicted in FIG. 5).

The communication system 10 further includes the UE 22 already referred to. The UE 22 may have hardware 80 that may include a radio interface 82 configured to set up and maintain a wireless connection 64 with a network node 16 serving a coverage area 18 in which the UE 22 is currently located. The radio interface 82 may be formed as or may include, for example, one or more RF transmitters, one or more RF receivers, and/or one or more RF transceivers.

The hardware 80 of the UE 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 90, which is stored in, for example, memory 88 at the UE 22, or stored in external memory (e.g., database, storage array, network storage device, etc.) accessible by the UE 22. The software 90 may be executable by the processing circuitry 84. The software 90 may include a client application 92. The client application 92 may be operable to provide a service to a human or non-human user via the UE 22. In providing the service to the user, the client application 92 may receive request data and provide user data in response to the request data. The client application 92 may interact with the user to generate the user data that it provides.

The processing circuitry 84 may be configured to control any of the methods and/or processes described herein and/or to cause such methods, and/or processes to be performed, e.g., by UE 22. The processor 86 corresponds to one or more processors 86 for performing UE 22 functions described herein. The UE 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 22, such as, for example, receiving test traffic from the network node 16 and responding to the test traffic, such as, for example, performing measurements on downlink signals, sending acknowledgements, reporting channel conditions, etc. and any other types of processing and/or communications associated with MU MIMO traffic.

In some embodiments, the inner workings of the network node 16, unmanned vehicle 24 and UE 22 may be as shown in FIG. 3 and independently, the surrounding network topology may be that of FIG. 2.

Although FIGS. 2 and 3 show various "units" such as Testing unit 32, and movement control unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
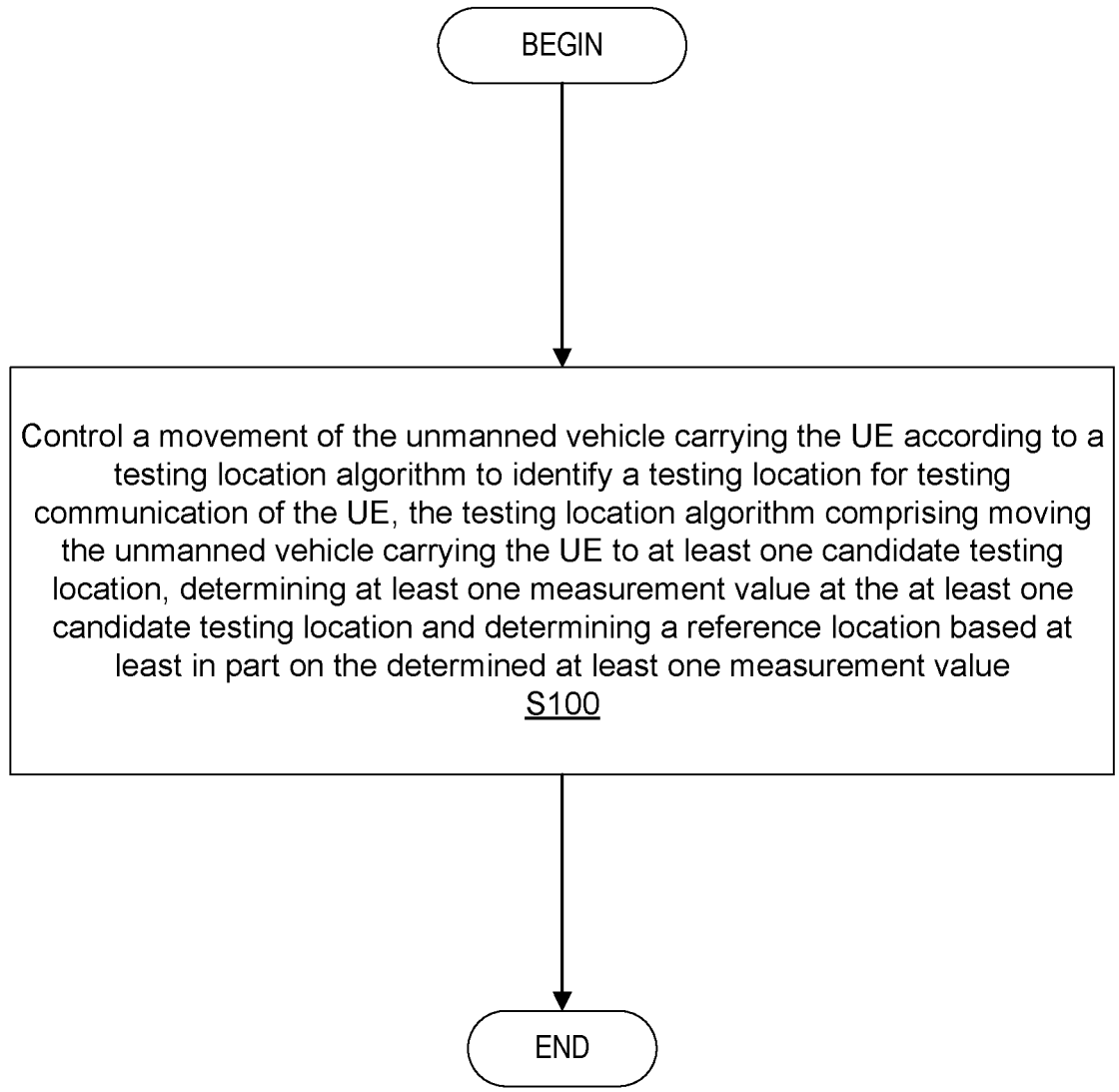
FIG. 4 is a flowchart of an exemplary method for a movement control unit according to one embodiment of the present disclosure.

FIG. 4 is a flowchart of an exemplary process in an unmanned vehicle 24 according to some embodiments of the present disclosure. One or more Blocks and/or functions and/or methods performed by unmanned vehicle 24 may be performed by one or more elements of unmanned vehicle 24 such as by movement control unit 34 in processing circuitry 42, processor 44, communication interface 40, etc. The example method includes controlling (Block S100), such as via movement control unit 34, processing circuitry 42, processor 44, communication interface 40, a movement of the unmanned vehicle 24 carrying the UE 22 according to a testing location algorithm to identify a testing location for testing communication of the UE 22. The testing location algorithm includes moving, such as via movement control unit 34, processing circuitry 42, processor 44, communication interface 40, the unmanned vehicle 24 carrying the UE 22 to at least one candidate testing location. The testing location algorithm includes determining, such as via movement control unit 34, processing circuitry 42, processor 44, communication interface 40, at least one measurement value at the at least one candidate testing location. The testing location algorithm includes determining, such as via movement control unit 34, processing circuitry 42, processor 44, communication interface 40, a reference location based at least in part on the determined at least one measurement value.

In some embodiments, the method includes, based on a predetermined condition, accepting the reference location as the testing location of the UE 22. In some embodiments, the controlling the movement of the unmanned vehicle 24 according to the testing location algorithm further includes, iteratively: moving, such as via movement control unit 34, processing circuitry 42, processor 44, communication interface 40, the unmanned vehicle 24 carrying the UE 22 from a first candidate testing location to a second candidate testing location and determining a measurement value when the UE 22 is at the second candidate testing location; determining, such as via movement control unit 34, processing circuitry 42, processor 44, communication interface 40, the reference location based at least in part on a comparison of at least a measurement value determined when the UE 22 is at the first candidate testing location and the measurement value determined when the UE 22 is at the second candidate testing location; and if a predetermined condition is met, accepting, such as via movement control unit 34, processing circuitry 42, processor 44, communication interface 40, the reference location as the testing location of the UE 22.

In some embodiments, the method further includes moving, such as via movement control unit 34, processing circuitry 42, processor 44, communication interface 40, the unmanned vehicle 24 carrying the UE 22 to the reference location for testing the communication of the UE 22 over the wireless network. In some embodiments, the determining the at least one measurement value at the at least one candidate testing location further includes determining, such as via movement control unit 34, processing circuitry 42, processor 44, communication interface 40, a measurement value of a test parameter associated with the communication of the UE 22 over the wireless network. In some embodiments, the determining the at least one measurement value at the at least one candidate testing location further includes determining, such as via movement control unit 34, processing circuitry 42, processor 44, communication interface 40, a throughput value for test traffic sent to the UE 22. In some embodiments, the controlling the movement of the unmanned vehicle 24 carrying the UE 22 further includes controlling a latitude, a longitude and an altitude of the unmanned vehicle 24 according to the testing location algorithm.

In some embodiments, the unmanned vehicle 24 is an unmanned aerial vehicle, UAV. In some embodiments, the identified testing location is for testing multi-user, MU, multiple-input multiple-output, MIMO, for a network node 16 in communication with the UE 22 and at least one other UE 22 over the wireless network. In some embodiments, the determining the reference location based at least in part on the determined measurement value further includes comparing, such as via movement control unit 34, processing circuitry 42, processor 44, communication interface 40, at least a first measurement value at a first candidate testing location to at least a second measurement value at a second candidate testing location; and updating, such as via movement control unit 34, processing circuitry 42, processor 44, communication interface 40, the reference location to one of the first candidate testing location and the second candidate testing location based on the comparison. In some embodiments, the moving the unmanned vehicle 24 carrying the UE 22 to the at least one candidate testing location further includes for each of a predetermined number of iterations, moving the unmanned vehicle 24 carrying the UE 22 a random distance away from a previous location.

Figure 5:
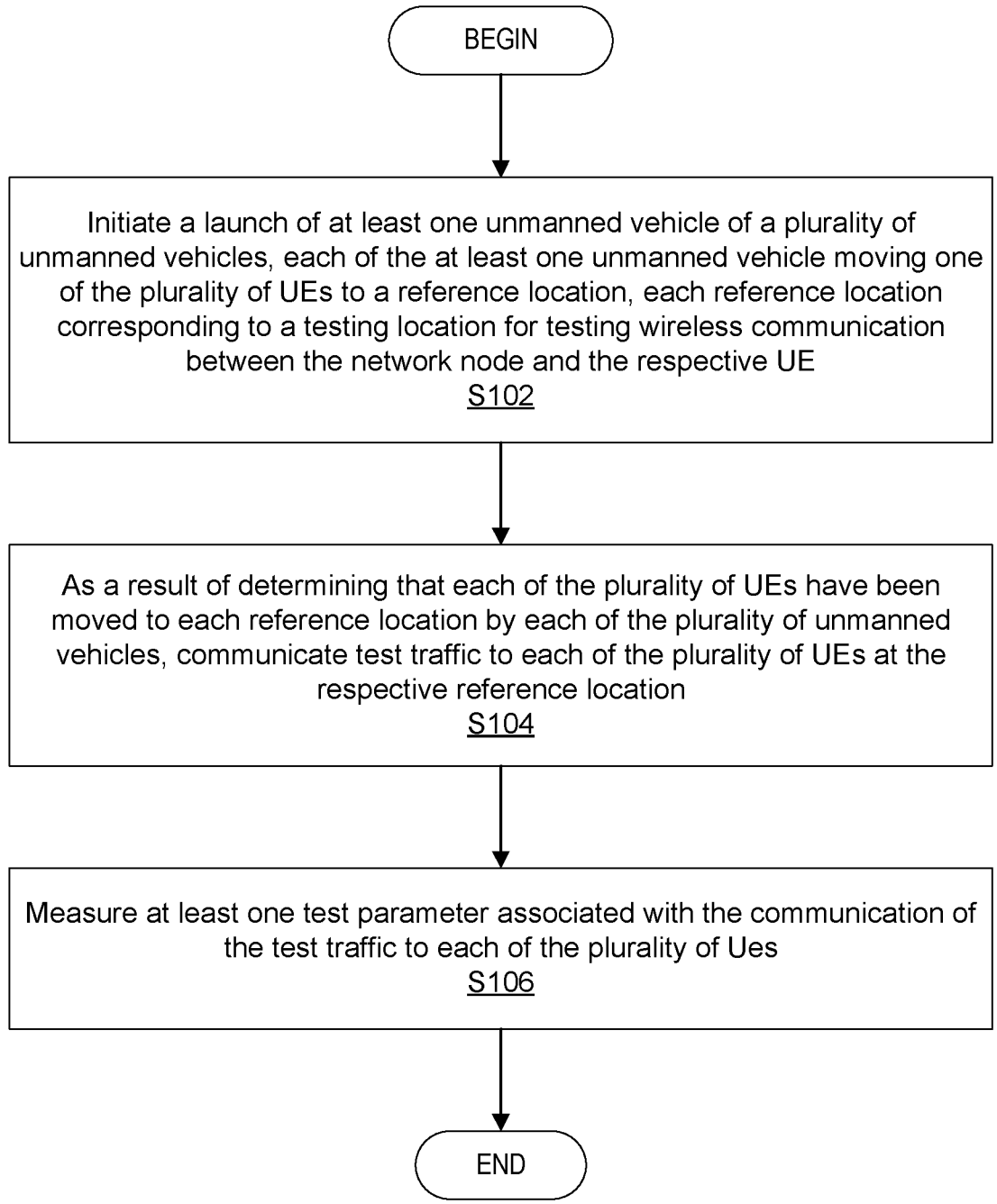
FIG. 5 is a flowchart of an exemplary method for a Testing unit according to one embodiment of the present disclosure.

FIG. 5 is a flowchart of an exemplary process in a network node 16 for testing wireless communication (e.g., MU MIMO) according to some embodiments of the present disclosure. One or more Blocks and/or functions and/or methods performed by the network node 16 may be performed by one or more elements of network node 16 such as by Testing unit 32, processing circuitry 68, processor 70, radio interface 62, etc. according to the example method. The example method includes initiating (Block S102), such as via Testing unit 32, processing circuitry 68, processor 70, radio interface 62, a launch of at least one unmanned vehicle 24 of a plurality of unmanned vehicles 24, each of the at least one unmanned vehicle 24 moving one of the plurality of UEs 22 to a reference location, each reference location corresponding to a testing location for testing wireless communication between the network node 16 and the respective UE 22. The method includes as a result of determining that each of the plurality of UEs 22 have been moved to each reference location by each of the plurality of unmanned vehicles 24, communicating (Block S104), such as via Testing unit 32, processing circuitry 68, processor 70, radio interface 62, test traffic to each of the plurality of UEs 22 at the respective reference location. The method includes measuring (Block S106), such as via Testing unit 32, processing circuitry 68, processor 70, radio interface 62, at least one test parameter associated with the communication of the test traffic to each of the plurality of UEs 22.

In some embodiments, the measuring the at least one test parameter further includes at least one of: measuring, such as via Testing unit 32, processing circuitry 68, processor 70, radio interface 62, a throughput of the communication of the test traffic to each of the plurality of UEs 22; calculating, such as via Testing unit 32, processing circuitry 68, processor 70, radio interface 62, a total traffic from the plurality of UEs 22; and calculating, such as via Testing unit 32, processing circuitry 68, processor 70, radio interface 62, a total throughput from the plurality of UEs 22. In some embodiments, the initiating the launch of the at least one unmanned vehicle 24 further includes initiating, such as via Testing unit 32, processing circuitry 68, processor 70, radio interface 62, the launch of each of the plurality of unmanned vehicles 24 to move a corresponding one of the plurality of UEs 22 to a center location of a beam, each one of the plurality of UEs 22 being moved to the center location of a different beam in a multi-user multiple-input multiple-output environment.

In some embodiments, the communicating the test traffic to each of the plurality of UEs 22 at the respective reference location further includes transmitting, via a multiple-input multiple-output, MIMO, antenna system, such as via Testing unit 32, processing circuitry 68, processor 70, radio interface 62, the test traffic to each UE 22 of the plurality of UEs 22 in a spatially separate beam using a same time-frequency resource. In some embodiments, the initiating the launch of the at least one unmanned vehicle 24 further includes initiating, such as via Testing unit 32, processing circuitry 68, processor 70, radio interface 62, the launch of the at least one unmanned vehicle 24 to move the respective UE 22 according to a testing location algorithm to identify the testing location for testing communication of the respective UE 22. In some embodiments, the testing location algorithm includes moving, such as via Testing unit 32, processing circuitry 68, processor 70, radio interface 62, the unmanned vehicle 24 carrying the UE 22 to at least one candidate testing location. In some embodiments, the testing location algorithm includes determining, such as via Testing unit 32, processing circuitry 68, processor 70, radio interface 62, at least one measurement value at the at least one candidate testing location. In some embodiments, the testing location algorithm includes determining, such as via Testing unit 32, processing circuitry 68, processor 70, radio interface 62, a reference location based at least in part on the determined at least one measurement value.

Having generally described arrangements for unmanned vehicle-assisted testing, functions and processes are provided as follows, and which may be implemented by the network node 16, and/or user equipment 22.

Figure 7:
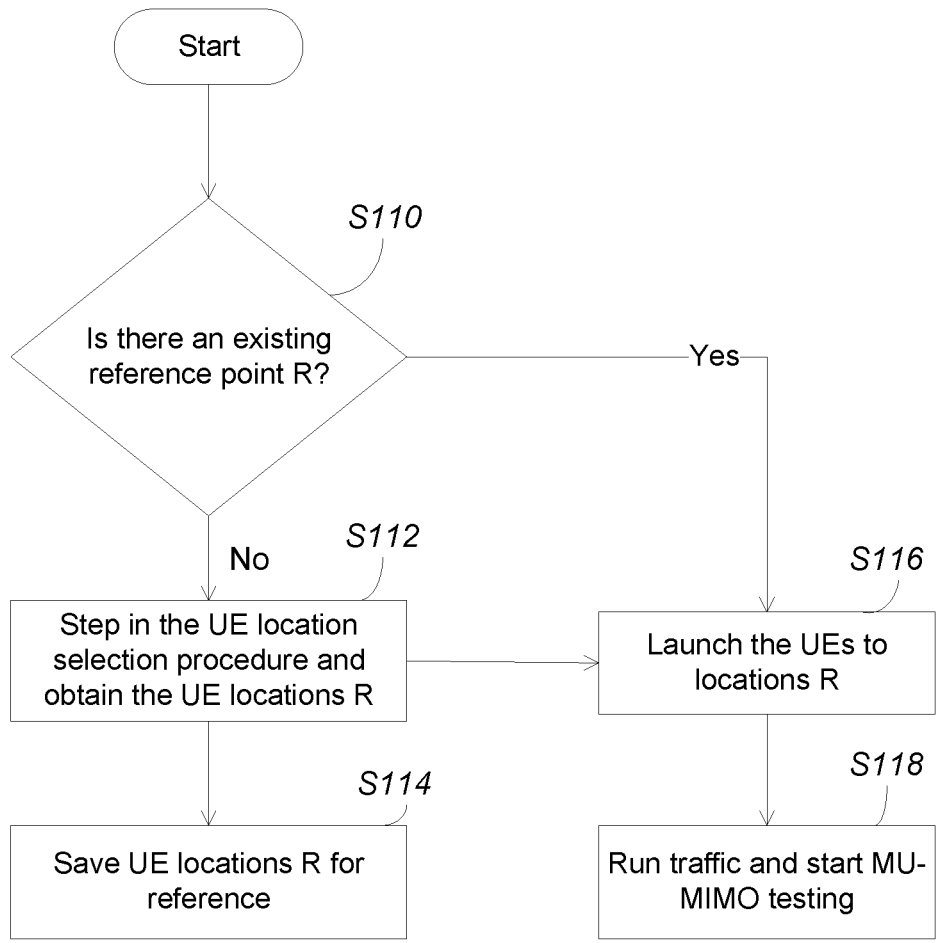
FIG. 7 is a flowchart of an exemplary algorithm for using AI unmanned vehicle(s) for MU-MIMO testing.

Some embodiments provide techniques and arrangements for testing features of a wireless network, such as, for example, MU-MIMO. An example embodiment is described with reference to the schematic diagram of FIG. 6 and the flow diagram of FIG. 7. FIG. 7 illustrates an example process implementing an AI testing location algorithm for MU-MIMO testing using the techniques in this disclosure. In some embodiments, when the test starts, the status of the test may be checked. In step S110, the testing location algorithm may include determining whether there are any existing reference points/locations, R. For example, if the test has been performed before and if a reference UE location (e.g., beam center) is available in e.g., a database and/or memory 46, the unmanned vehicle 24 can proceed to the reference location. In step S116, for example, the network node 16 can launch the unmanned vehicles 24 carrying the UEs 22 to the reference locations R since reference locations have already been determined. An example of unmanned vehicles 24a and 24n carrying UEs 22a and 22n toward reference locations R1 and Rn, respectively, is depicted in FIG. 6. In step S118, e.g., when the unmanned vehicles 24 carrying the UEs 22 have reached the reference locations R, the network node 16 can run traffic and start the MU-MIMO testing.

On the other hand, if there are no UE reference locations available, the process may proceed to step S112, where the testing location algorithm can be used to identify a reference location and use such reference location as a testing location for UE 22 for testing e.g., MU-MIMO. In step S114, the identified UE reference locations may be saved in a database and/or memory (e.g., memory 46 at the unmanned vehicle 24 and/or memory 72 at the network node 16) for future use (e.g., steps S116). When the test starts, if there are UE reference locations available from previous tests, the unmanned vehicle(s) 24 can transport the UE(s) 22 to the reference locations stored in the database and/or memory. This can save a lot of time and effort in conducting testing. However, if the previously available reference locations are not used for some reasons (e.g., criteria of determining reference location is changed), or are unavailable (due to e.g. environmental and/or landscape change), the testing location algorithm can be run again to identify reference locations without using any previously determined reference locations.

Examples of the testing location algorithm, which may be implemented by unmanned vehicle 24 and/or network node 16, are described below in more detail and may advantageously be used to identify/determine a set of reference locations for all UEs 22 for e.g., the MU-MIMO testing.

Testing Location Algorithm for UE Location Selection

Scenario One: Location Selection for a Single UE

In some embodiments, one or more of the following parameters and/or inputs may be used for the testing location algorithm for a single UE 22:

Network node 16 location (longitude, latitude, altitude which may be represented by e.g., variables lo_org; la_org; al_org). Location or a space point may be represented by longitude, latitude and altitude coordinates.

Minimum coordinator: (lo_min, la_min, al_min); used to limit the unmanned vehicle 24 in the network node 16 coverage area(s).

Maximum coordinator: (lo_max, a_max, al_max); used to limit the unmanned vehicle 24 in the network node 16 coverage area(s).

Step distance from previous location (d_min): used to determine step size (e.g., distance to move to a next candidate testing location);

Step distance from previous location (d_max): used to determine step size (e.g., distance to move to a next candidate testing location);

Single UE throughput threshold (T_threhold);

Moving time counter N: determines the number of times the UE 22 is transported to candidate testing positions; impacts the algorithm and there is a tradeoff between the precision and the speed;

Dead loop protection counter M;

Dead loop protection counter K; and/or

One layer per UE 22.

In some embodiments, the goal of the testing location algorithm may be to find a selected reference location R(1) for UE(1) 22 that will allow the UE(1) 22 to have a maximum throughput (e.g., to reach and/or exceed a predetermined maximum throughput threshold value). It should be noted that UE(i) is used in the present disclosure to represent the ith UE 22. R(i) is used to represent the locations of UE(1) to UE(i).

In some embodiments, the testing location algorithm (performed by unmanned vehicle 24 and/or network node 16) for finding a testing location for a single UE 22 may proceed according to the following steps:

Step 1

Launch, e.g., by network node 16, an unmanned vehicle 24 carrying UE(1) 22 to any location (lo(1,1), la(1,1), al(1,1)) (which may be considered a candidate testing location) while the location meets the conditions that the unmanned vehicle 24 is within the network node 16 coverage area(s) which are limited by (lo_min, la_min, al_min) and (lo_max, a_max, al_max). The first "1" in lo(1,1) is used in this disclosure to represent the number of the UE 22. The second "1" in lo(1,1) is used in this disclosure as a notation to represent the first longitude location. Similar notations are used for latitude and longitude, respectively, la(1,1) and al(1,1).

Step 2

The network node 16 may run traffic (e.g., send test data to the UE(1) 22) and measure the throughput T(1) where T(1)=T(1,1) in this case. The first "1" in T(1,1) is used in this disclosure to represent the number of the UE and the second "1" in T(1,1) is a notation to represent the measured throughput at the first location. The T(1) is used in this disclosure to represent the throughput of UE(1) and T(i) is used to represent the paring throughput of UE(1) to UE(i).

If the throughput T(1)>T_threshold (which means the UE 22 is in the coverage area of the network node 16), then proceed to step 3 below; otherwise, return to step 1 above (where the unmanned vehicle 24 can try to move to another location that is within the network node 16 coverage area(s)). If the attempts to find a location within the network node 16 coverage area exceeds M times, then the unmanned vehicle 24 may transport the UE 22 back to the original starting location and provide a warning or alarm for this condition.

Step 3

Save/store the candidate testing location and the measured throughput as a reference location R(1)=(lo(1,1), la(1,1), al(1,1)) and corresponding throughput T(1)=T(1,1).

Step 4

The unmanned vehicle 24 may transport/move UE(1) 22 again to another candidate testing location (lo(1,2), la(1,2), al(1,2)) within altitude al_min to al_max and using a random distance between d_min and d_max away from the previous location. The network node 16 may run the traffic and measure the throughput T(1)' where T(1)'=T(1,2).

It should be noted that the "2" in lo(1,2) is a location notation used to represent the longitude of the second location that UE(1) 22 is moved to. Similar notation is used to represent the latitude and altitude of the second location that UE(1) 22 moved to (la(1,2), al(1,2)). The "2" in T(1,2) is a notation used in this disclosure to represent the measured throughput of UE(1) 22 at the second location.

Step 5

Update the reference location/point: R(1)=(lo(1,2), la(1,2), al(1,2)) and T(1)=T(1)' to the new candidate testing location coordinates if the throughput T(1)' is larger than T(1); otherwise there is no change to the stored reference location R(1) and corresponding throughput T(1).

Step 6

Repeat step 4 and 5 for N times to obtain the maximum throughput T(1) and the location R(1) which has the maximum throughput T(1) (e.g., as compared to other measured throughput values at other candidate testing locations).

Step 7

Save the reference location R(1) and the throughput T(1) to e.g., database and/or memory for later use.

Scenario Two: Location Selection for Two UEs

In some embodiments, one or more of the following parameters and/or inputs may be used for the testing location algorithm for location selection for two UEs 22:

Network node 16 location (longitude, latitude, altitude which may be represented by e.g., variables lo_org; la_org; al_org). Location or a space point may be represented by longitude, latitude and altitude coordinates.

Minimum coordinator: (lo_min, la_min, al_min); used to limit the unmanned vehicle 24 in the network node 16 coverage area(s).

Maximum coordinator: (lo_max, a_max, al_max); used to limit the unmanned vehicle 24 in the network node 16 coverage area(s).

Step distance from previous location (d_min): used to determine step size (e.g., distance to move to a next candidate testing location);

Step distance from previous location (d_max): used to determine step size (e.g., distance to move to a next candidate testing location);

Single UE throughput threshold (T_threhold);

Moving time counter N: impacts the algorithm and there is a tradeoff between the precision and the speed;

Dead loop protection counter M;

Dead loop protection counter K;

One layer per UE 22; and/or

UE(1) reference location/point R(1), T(1).

In some embodiments, the goal of the testing location algorithm may be to find selected locations R(1) and R(2) for UE(1) 22 and UE(2) 22, respectively, that will result in UE(1) 22 and UE(2) 22 pairing and achieve the maximum throughput.

In some embodiments, the testing location algorithm (performed by unmanned vehicle 24 and/or network node 16) for finding testing locations for two UEs 22 (and/or more specifically, transporting UE(1) 22 to a reference location and finding a testing location for the second UE, UE(2) 22) may proceed according to the following steps:

Step 1

Launch, e.g., by network node 16, an unmanned vehicle 24 carrying UE(1) 22 to the reference location R(1) (assuming that there is already a reference location stored for UE(1) 22 from, for example, execution of scenario one).

Step 2

Launch another unmanned vehicle 24 carrying UE(2) 22 to a new candidate testing location R(2)=(lo(2,1), la(2,1), al(2,1)) where R(2) meets the condition that the unmanned vehicle 24 is within the network node 16 coverage area(s) which are limited by (lo_min, la_min, al_min) and (lo_max, a_max, al_max).

Step 3

The network node 16 may run traffic and measure the throughput for UE(2) 22 which is represented by T(2,1). If the throughput T(2,1)>T_threshold (which means that UE(2) 22 is in the coverage area of the network node 16), then the process may proceed to step 4 below; otherwise, the process may return to step 2 above (where the unmanned vehicle 24 can try to move to another location that is within the network node 16 coverage area(s)). If the attempts to find a location within the network node 16 coverage area exceeds M times, then the unmanned vehicle 24 may transport the UE(2) 22 back to the original starting location and provide a warning or alarm for this condition.

Step 4

The network node 16 may check the pairing condition between UE(1) 22 and UE(2) 22 and measure the throughput for both UEs 22. The throughput for both UEs 22 may be represented by T(2) where T(2)=T(1,1)+T(2,1) and T(1,1) is the throughput from UE(1) 22 and T(2,1) is the throughput from UE(2) 22.

Step 5

If there is no pairing for UE(1) 22 and UE(2) 22, an assumption may be made that these two UEs 22 are in the same beam. In this case, the unmanned vehicle 24 moves UE(2) 22 away from this beam and the process may return to step 2 above (where the unmanned vehicle 24 carrying UE(2) 22 attempts to move the UE(2) 22 to yet another location). On the other hand, if there is a pairing between UE(1) 22 and UE(2) 22 (e.g., spatially separated UEs receive their own data from the network node on the same shared time-frequency resource(s) simultaneously) the process may proceed to step 6 below.

It may also be the case that the number of layers is less than the number of UEs 22, i.e, if there are two UEs 22 but there is only one layer in the coverage area, then it may be impossible for the network node 16 to detect the pairing. Thus, in some embodiments, a dead loop protection counter may be used for this case. For example, after the process returns to step 2 for K times without pairing, then the unmanned vehicle 24 may transport the UE(2) 22 back to the original starting location and provide a warning or alarm for this condition.

Step 6

The unmanned vehicle 24 may transport the UE(2) 22 again to a new candidate testing location (lo(2,2), la(2,2), al(2,2)) within al_min to al_max and with a random distance between d_min and d_max away from the previous location. The network node 16 may run the traffic and measure the throughput T(2)' where T(2)'=T(1,2)+T(2,2). It should be noted that T(1,2) is the throughput from UE(1) 22 and T(2,2) is the throughput from UE(2) 22.

Step 7

Update the reference location/point R(2) and the throughput T(2) to the new candidate testing location coordinates and corresponding measured throughput (i.e., R(2)=(lo(2,2), la(2,2), al(2,2)) and T(2)=T(2,2)) if the throughput T(2)' is larger than T(2).

Step 8

Repeat steps 4, 5 and 6 for N times to obtain the reference locations that have a maximum throughput (e.g., as compared to other measured throughput values at other candidate testing locations).

Step 9

After N times (or another predetermined condition), update and save the throughput values and the corresponding reference locations: T=[T(1), T(2)]; R=[R(1), R(2)].

Scenario Three: Location Selection for Three UEs

In some embodiments, one or more of the following parameters and/or inputs may be used for the testing location algorithm for location selection for three UEs 22:

In some embodiments, one or more of the following parameters and/or inputs may be used for the testing location algorithm for location selection for two UEs 22:

Network node 16 location (longitude, latitude, altitude which may be represented by e.g., variables lo_org; la_org; al_org). Location or a space point may be represented by longitude, latitude and altitude coordinates.

Minimum coordinator: (lo_min, la_min, al_min); used to limit the unmanned vehicle 24 in the network node 16 coverage area(s).

Maximum coordinator: (lo_max, a_max, al_max); used to limit the unmanned vehicle 24 in the network node 16 coverage area(s).

Step distance from previous location (d_min): used to determine step size (e.g., distance to move to a next candidate testing location);

Step distance from previous location (d_max): used to determine step size (e.g., distance to move to a next candidate testing location);

Single UE throughput threshold (T_threhold);

Moving time counter N: impacts the algorithm and there is a tradeoff between the precision and the speed;

Dead loop protection counter M;

Dead loop protection counter K;

One layer per UE 22; and/or

UE(1) and UE(2) reference locations/points [R(1), R(2)] and corresponding throughput [T(1), T(2)].

In some embodiments, the goal of the testing location algorithm may be to find selected locations R(1), R(2) and R(3) for UE(1), UE(2) and UE(3), respectively, that will result in UE(1) 22, UE(2) 22 and UE(3) 22 pairing and achieve the maximum throughput.

In some embodiments, the testing location algorithm (performed by unmanned vehicle 24 and/or network node 16) for finding testing locations for three UEs 22 (and/or more specifically, transporting UE(1) 22 and UE(2) 22 to their respective reference locations and finding a testing location for the third UE, UE(3) 22) may proceed according to the following steps:

Step 1

Launch, e.g., by network node 16, unmanned vehicles 24 carrying UE(1) 22 and UE(2) 22 to the locations [R(1), R(2)].

Step 2

Launch an unmanned vehicle 24 carrying UE(3) 22 to a new candidate testing location R(3)=(lo(3,1), la(3,1), al(3,1)) where R(3) meets the condition that the unmanned vehicle 24 is within the network node 16 coverage area(s) which are limited by (lo_min, la_min, al_min) and (lo_max, a_max, al_max).

Step 3

The network node 16 may run traffic and measure the throughput for UE(3) 22 which is represented by T(3,1). If the throughput T(3,1)>T_threshold (which means the UE(3) 22 is in the coverage area of the network node 16), then the process may proceed to step 4; otherwise, the process may return to step 2 above (where the unmanned vehicle 24 can try to move the UE(3) 22 to another location that is within the network node 16 coverage area(s)). If the attempts to find a location within the network node 16 coverage area exceeds M times, then the unmanned vehicle 24 may transport the UE(3) 22 back to the original starting location and provide a warning or alarm for this condition.

Step 4

The network node 16 may run the traffic (e.g., send test data to the UEs 22), check the pairing condition and measure the throughput for all UEs T(3), where T(3)=T(1,1)+T(2,1)+T(3,1). Throughput T(1,1) is the throughput from UE(1) 22; T(2,1) is the throughput from UE(2) 22; and T(3,1) is the throughput from UE(3) 22.

Step 5

If there is no pairing from UE(3) 22 to UE(1) 22, UE(2) 22 and/or UE(3) 22, an assumption may be made that UE(3) 22 is in the same beam with at least one of the other UEs (e.g., UE(1) 22 or UE(2) 22). In this case, the unmanned vehicle 24 transports UE(3) 22 away from the current beam and the process may return to step 2 above (where the unmanned vehicle 24 carrying UE(3) 22 attempts to move the UE(3) 22 to yet another location). On the other hand, if there is a pairing between UE(1) 22, UE(2) 22 and UE(3) 22, the process may proceed to step 6 below.

It may also be the case that the number of layers is less than the number of UEs 22, i.e, if there are three UEs 22 but there is only one layer in the coverage area, then it may be impossible for the network node 16 to detect the pairing. Thus, in some embodiments, a dead loop protection counter may be used for this case. For example, after the process returns to step 2 for K times without pairing, then the unmanned vehicle 24 may transport the last UE(3) 22 back to the original starting location and provide a warning or alarm for this condition.

Step 6

The unmanned vehicle 24 may transport the UE(3) 22 again to a new candidate testing location (lo(3,2), la(3,2), al(3,2)) within al_min to al_max and with a random distance between d_min and d_max away from the previous location. The network node 16 may run traffic and check the throughput T(3)' where T(3)'=T(1,2)+T(2,2)+T(3,2). It should be noted that T(1,2) is the throughput from UE(1) 22; T(2,2) is the throughput from UE(2) 22 and T(3,2) is the throughput from UE(3) 22.

Step 7

Update the reference location/point R(3)=(lo(3,2), la(3,2), al(3,2)) and update the throughput T(3)=T(3)' if the throughput T(3)' is larger than T(3).

Step 8

Repeat steps 6 and 7 for N times to obtain the reference locations that have a maximum throughput (e.g., as compared to other measured throughput values at other candidate testing locations).

Step 9

After N times (or another predetermined condition), update and save the throughput values and the corresponding reference locations: T=[T(1), T(2), T(3)]; R=[R(1), R(2), R(3)].

General Scenario: Location Selection for Multiple UEs

In some embodiments, one or more of the following parameters and/or inputs may be used for the testing location algorithm for location selection for multiple UEs 22:

Network node 16 location (longitude, latitude, altitude which may be represented by e.g., variables lo_org; la_org; al_org). Location or a space point may be represented by longitude, latitude and altitude coordinates.

Minimum coordinator: (lo_min, la_min, al_min); used to limit the unmanned vehicle 24 in the network node 16 coverage area(s).

Maximum coordinator: (lo_max, a_max, al_max); used to limit the unmanned vehicle 24 in the network node 16 coverage area(s).

Step distance from previous location (d_min): used to determine step size (e.g., distance to move to a next candidate testing location);

Step distance from previous location (d_max): used to determine step size (e.g., distance to move to a next candidate testing location);

Single UE throughput threshold (T_threhold);

Moving time counter N: impacts the algorithm and there is a tradeoff between the precision and the speed;

Dead loop protection counter M;

Dead loop protection counter K;

One layer per UE 22; and/or

Reference locations/points [R(1), R(2), . . . , R(L-1)] and corresponding measured throughput [T(1), T(2), . . . , T(L-1)].

In some embodiments, the goal of the testing location algorithm may be to find selected locations R for any number of UEs 22, such as from UE(1) to UE(L), that will make use of MU-MIMO to achieve a maximum throughput.

In some embodiments, the testing location algorithm (performed by unmanned vehicle 24 and/or network node 16) for finding testing locations for multiple UEs 22 may proceed according to the following steps:

Step 1

Launch, e.g., by network node 16, unmanned vehicles 24 carrying UE(1), UE(2), . . . , UE(L-1) to reference locations [R(1), R(2), . . . , R(L-1)].

Step 2

Launch an unmanned vehicle 24 carrying UE(L) 22 to a new candidate testing location R(L)=(lo(L,1), la(L,1), al(L,1)) where R(L) meets the condition that the unmanned vehicle 24 is within the network node 16 coverage area(s) which are limited by (lo_min, la_min, al_min) and (lo_max, a_max, al_max).

Step 3

The network node 16 may run traffic and measure the throughput for UE(L) 22 which is represented by T(L,1). If the throughput for UE(L) T(L,1)>T_threshold (which means the UE(L) 22 is in the coverage area of the network node 16), then the process may proceed to step 4. Otherwise the process may return to step 2 above (where the unmanned vehicle 24 can try to move the UE(3) 22 to another location that is within the network node 16 coverage area(s)). If the attempts to find a location within the network node 16 coverage area exceeds M times, then the unmanned vehicle 24 may transport the UE(L) 22 back to the original starting location and provide a warning or alarm for this condition.

Step 4

The network node 16 may run the traffic (e.g., send test data to the UEs 22), check the pairing condition and measure the throughput for all UEs T(L), where T(L)=T(1,1)+T(2,1), + . . . , T(L,1). Throughput T(1,1) is the throughput from UE(1) 22; T(2,1) is the throughput from UE(2) 22; etc.

Step 5

If there is no pairing for the other the UEs 22 with UE(L) 22, an assumption may be made that UE(L) 22 is in the same beam with at least one of the other UEs 22 (e.g., UE(1) 22, UE(2) 22, . . . , or UE(L−1) 22). In this case, the unmanned vehicle 24 may transport UE(L) 22 away from the current beam and the process may return to step 2 above (where the unmanned vehicle 24 carrying UE(L) 22 attempts to move the UE(L) 22 to yet another location). On the other hand, if there is a pairing between UE(1) 22, UE(2) 22, . . . , and UE(L−1) 22, the process may proceed to step 6 below.

It may also be the case that the number of layers is less than the number of UEs 22, i.e, if there are L UEs 22 but there is only one layer in the coverage area, then it may be impossible for the network node 16 to detect the pairing. Thus, in some embodiments, a dead loop protection counter may be used for this case. For example, after the process returns to step 2 for K times without pairing, then the unmanned vehicle 24 may transport the last UE(L) 22 back to the original starting location and provide a warning or alarm for this condition.

Step 6

The unmanned vehicle 24 may transport the UE(L) 22 again to a new candidate testing location (lo(L,2), la(L,2), al(L,2)) within al_min to al_max and with a random distance between d_min and d_max away from the previous location. The network node 16 may run traffic and measure/check the throughput T(L)' where T(L)'=T(1,2)+T(2,2)+, . . . , +T(L,2). It should be noted that T(1,2) is the throughput from UE(1) 22; T(2,2) is the throughput from UE(2); T(L,2) is the throughput from UE(L) 22; etc.

Step 7

Update the reference location/point: R(L)=(lo(L,2), la(L,2), al(L,2)) and update the throughput T(L)=T(L)' with the candidate testing location coordinates and corresponding measured throughput values, if the throughput T(L)' is larger than T(L).

Step 8

Repeat step 6 and 7 for N times to obtain the reference locations that have a maximum throughput (e.g., as compared to other measured throughput values at other candidate testing locations).

Step 9

After N times (or another predetermined condition), update and save the throughput values and the corresponding reference locations: T=[T(1) T(2), . . . , T(L)]; R=[R(1) R(2), . . . , R(L)].

These reference locations may be used by the network node 16 and/or unmanned vehicles 24 to conveniently transport UEs 22 to the proper testing locations when testing, such as, MU-MIMO testing is to be performed. Advantageously, the algorithm may not need to be executed for every test. Once the algorithm is run to identify the UE 22 testing locations for the network, the unmanned vehicles 24 can simply transport the UEs 22 to those stored testing locations when testing is desired.

MU-MIMO Testing

After the testing location algorithm has been performed to identify and/or transport UEs 22 (UE(1)-UE(L)) to the corresponding reference locations R(1)-R(L), the MU-MIMO testing may proceed. For example, MU-MIMO testing may be used to verify if the number of beams (layers) meets or exceeds expectations, e.g., if there are improvements that may be made. MU-MIMO testing may also verify if the maximum throughput meets the expected throughput. Testing may also be performed to verify whether improvements can be made to a scheduler algorithm. Yet other types of tests can be performed using AI unmanned vehicles 24 to implement the testing location algorithm described in the present disclosure.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| AAS | Active Antenna System |
| AI | Artificial Intelligence |
| MIMO | multiple-input and multiple-output |
| MU-MIMO | Multi-user MIMO |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method performed by an unmanned vehicle for wireless network testing, the unmanned vehicle configured to transport a user equipment, UE, the UE being configured to communicate over a wireless network, the method comprising:
   controlling a movement of the unmanned vehicle carrying the UE according to a testing location algorithm to identify a testing location for testing communication of the UE, the testing location algorithm comprising moving the unmanned vehicle carrying the UE to at least one candidate testing location, determining at least one measurement value at the at least one candidate testing location and determining a reference location based at least in part on the determined at least one measurement value.

2. The method of claim 1, further comprising:
   based on a predetermined condition, accepting the reference location as the testing location of the UE.

3. The method of claim 1, wherein the controlling the movement of the unmanned vehicle according to the testing location algorithm further comprises, iteratively:
   moving the unmanned vehicle carrying the UE from a first candidate testing location to a second candidate testing location and determining a measurement value when the UE is at the second candidate testing location;
   determining the reference location based at least in part on a comparison of at least a measurement value determined when the UE is at the first candidate testing location and the measurement value determined when the UE is at the second candidate testing location; and
   if a predetermined condition is met, accepting the reference location as the testing location of the UE.

4. The method of claim 1, further comprising:
   moving the unmanned vehicle carrying the UE to the reference location for testing the communication of the UE over the wireless network.

5. The method of claim 1, wherein the determining the at least one measurement value at the at least one candidate testing location further comprises:
   determining a measurement value of a test parameter associated with the communication of the UE over the wireless network.

6. The method of claim 1, wherein the determining the at least one measurement value at the at least one candidate testing location further comprises:
   determining a throughput value for test traffic sent to the UE.

7. The method of claim 1, wherein the controlling the movement of the unmanned vehicle carrying the UE further comprises controlling a latitude, a longitude and an altitude of the unmanned vehicle according to the testing location algorithm.

8. The method of claim 1, wherein the unmanned vehicle is an unmanned aerial vehicle, UAV.

9. The method of claim 1, wherein the identified testing location is for testing multi-user, MU, multiple-input multiple-output, MIMO, for a network node in communication with the UE and at least one other UE over the wireless network.

10. The method of claim 1, wherein the determining the reference location based at least in part on the determined measurement value further comprises:
comparing at least a first measurement value at a first candidate testing location to at least a second measurement value at a second candidate testing location; and
updating the reference location to one of the first candidate testing location and the second candidate testing location based on the comparison.

11. The method of claim 1, wherein the moving the unmanned vehicle carrying the UE to the at least one candidate testing location further comprises:
for each of a predetermined number of iterations, moving the unmanned vehicle carrying the UE a random distance away from a previous location.

12. An unmanned vehicle for wireless network testing, the unmanned vehicle configured to transport a user equipment, UE, the UE being configured to communicate over a wireless network, the unmanned vehicle comprising processing circuitry configured to cause the unmanned vehicle to:
control a movement of the unmanned vehicle, carrying a user equipment, UE, according to a testing location algorithm to identify a testing location for testing communication of the UE over a wireless network, the testing location algorithm comprising moving the unmanned vehicle carrying the UE to at least one candidate testing location, determining at least one measurement value at the at least one candidate testing location and determining a reference location based at least in part on the determined at least one measurement value.

13. The unmanned vehicle of claim 12, wherein the processing circuitry is further configured to:
based on a predetermined condition, accept the reference location as the testing location of the UE.

14. The unmanned vehicle of claim 12, wherein the processing circuitry is further configured to control the movement of the unmanned vehicle according to the testing location algorithm by being further configured to, iteratively:
move the unmanned vehicle carrying the UE from a first candidate testing location to a second candidate testing location and determine a measurement value when the UE is at the second candidate testing location;
determine the reference location based at least in part on a comparison of at least a measurement value determined when the UE is at the first candidate testing location and the measurement value determined when the UE is at the second candidate testing location; and
if a predetermined condition is met, accept the reference location as the testing location of the UE.

15. The unmanned vehicle of claim 12, wherein the processing circuitry is further configured to:
move the unmanned vehicle carrying the UE to the reference location for testing the communication of the UE over the wireless network.

16. The unmanned vehicle of claim 12, wherein the processing circuitry is further configured to determine the at least one measurement value at the at least one candidate testing location by being configured to:
determine a measurement value of a test parameter associated with the communication of the UE over the wireless network.

17. The unmanned vehicle of claim 12, wherein the processing circuitry is further configured to determine the at least one measurement value at the at least one candidate testing location by being configured to:
determine a throughput value for test traffic sent to the UE.

18. The unmanned vehicle of claim 12, wherein the processing circuitry is further configured to control the movement of the unmanned vehicle carrying the UE by being configured to:
control a latitude, a longitude and an altitude of the unmanned vehicle according to the testing location algorithm.

19. The unmanned vehicle of claim 12, wherein the unmanned vehicle is an unmanned aerial vehicle, UAV.

20. The unmanned vehicle of claim 12, wherein the identified testing location is for testing multi-user, MU, multiple-input multiple-output, MIMO, for a network node in communication with the UE and at least one other UE over the wireless network.

21. The unmanned vehicle of claim 12, wherein the processing circuitry is further configured to determine the reference location based at least in part on the determined measurement value by being configured to:
compare at least a first measurement value at a first candidate testing location to at least a second measurement value at a second candidate testing location; and
update the reference location to one of the first candidate testing location and the second candidate testing location based on the comparison.

22. The unmanned vehicle of claim 12, wherein the processing circuitry is further configured to move the unmanned vehicle carrying the UE to the at least one candidate testing location by being configured to:
for each of a predetermined number of iterations, move the unmanned vehicle carrying the UE a random distance away from a previous location.

23. A method performed by a network node configured to test wireless communication with a plurality of user equipments, UEs, the method comprising:
initiating a launch of at least one unmanned vehicle of a plurality of unmanned vehicles, each of the at least one unmanned vehicle moving one of the plurality of UEs to a reference location, each reference location corresponding to a testing location for testing wireless communication between the network node and a respective UE;
as a result of determining that each of the plurality of UEs have been moved to each reference location by each of the plurality of unmanned vehicles, communicating test traffic to each of the plurality of UEs at the respective reference location; and
measuring at least one test parameter associated with the communication of the test traffic to each of the plurality of UEs, wherein the initiating the launch of the at least one unmanned vehicle further comprises:
initiating the launch of each of the plurality of unmanned vehicles to move a corresponding one of the plurality of UEs to a center location of a beam, each one of the plurality of UEs being moved to a center location of a different beam in a multi-user multiple-input multiple-output environment.

24. The method of claim 23, wherein the measuring the at least one test parameter further comprises at least one of:
measuring a throughput of the communication of the test traffic to each of the plurality of UEs;

calculating a total traffic from the plurality of UEs; and
calculating a total throughput from the plurality of UEs.

25. The method of claim 23, wherein the communicating the test traffic to each of the plurality of UEs at the respective reference location further comprises:
transmitting, via a multiple-input multiple-output, MIMO, antenna system, the test traffic to each UE of the plurality of UEs in a spatially separate beam using a same time-frequency resource.

26. The method of claim 23, wherein the initiating the launch of the at least one unmanned vehicle further comprises:
initiating the launch of the at least one unmanned vehicle to move the respective UE according to a testing location algorithm to identify the testing location for testing communication of the respective UE, the testing location algorithm comprising moving the unmanned vehicle carrying the UE to at least one candidate testing location, determining at least one measurement value at the at least one candidate testing location and determining the reference location based at least in part on the determined at least one measurement value.

27. A network node configured to test wireless communication with a plurality of user equipments, UEs, the network node comprising processing circuitry configured to:
initiate a launch of at least one unmanned vehicle of a plurality of unmanned vehicles, each of the at least one unmanned vehicle moving one of the plurality of UEs to a reference location, each reference location corresponding to a testing location for testing wireless communication between the network node and a respective UE;
as a result of determining that each of the plurality of UEs have been moved to each reference location by each of the plurality of unmanned vehicles, communicate test traffic to each of the plurality of UEs at the respective reference location; and
measure at least one test parameter associated with the communication of the test traffic to each of the plurality of UEs, wherein the processing circuitry is further configured to initiate the launch of the at least one unmanned vehicle by being configured to:
initiate the launch of each of the plurality of unmanned vehicles to move a corresponding one of the plurality of UEs to a center location of a beam, each one of the plurality of UEs being moved to a center location of a different beam in a multi-user multiple-input multiple-output environment.

28. The network node of claim 27, wherein the processing circuitry is further configured to measure the at least one test parameter by being configured to at least one of:
measure a throughput of the communication of the test traffic to each of the plurality of UEs;
calculate a total traffic from the plurality of UEs; and
calculate a total throughput from the plurality of UEs.

29. The network node of claim 27, wherein the processing circuitry is further configured to communicate the test traffic to each of the plurality of UEs at the respective reference location by being configured to:
transmit, via a multiple-input multiple-output, MIMO, antenna system, the test traffic to each UE of the plurality of UEs in a spatially separate beam using a same time-frequency resource.

30. The network node of claim 27, wherein the processing circuitry is further configured to initiate the launch of the at least one unmanned vehicle by being configured to:
initiate the launch of the at least one unmanned vehicle to move the respective UE according to a testing location algorithm to identify the testing location for testing communication of the respective UE, the testing location algorithm comprising moving the unmanned vehicle carrying the UE to at least one candidate testing location, determining at least one measurement value at the at least one candidate testing location and determining the reference location based at least in part on the determined at least one measurement value.

* * * * *